US012636871B2

(12) United States Patent (10) Patent No.: US 12,636,871 B2
Zeng et al. (45) Date of Patent: May 26, 2026

(54) METHODS AND DEVICES FOR LAMINATING

(71) Applicant: ZHEJIANG DAHUA TECHNOLOGY CO., LTD., Hangzhou (CN)

(72) Inventors: Xiantao Zeng, Hangzhou (CN); Qiujia Fu, Hangzhou (CN); Yikun Liang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 373 days.

(21) Appl. No.: 18/323,394

(22) Filed: May 24, 2023

(65) Prior Publication Data

US 2023/0294392 A1 Sep. 21, 2023

Related U.S. Application Data

(63) Continuation of application No. PCT/CN2021/132240, filed on Nov. 23, 2021.

(30) Foreign Application Priority Data

Nov. 24, 2020 (CN) .......................... 202011330206.2

(51) Int. Cl.
 B32B 41/00 (2006.01)
 B32B 37/12 (2006.01)
 (Continued)

(52) U.S. Cl.
 CPC .......... B32B 41/00 (2013.01); B32B 37/1284 (2013.01); B32B 37/22 (2013.01); (Continued)

(58) Field of Classification Search
 USPC ....... 156/264, 265, 552, 474, 204, 205, 227, 156/435, 254, 259; 493/441
 See application file for complete search history.

(56) References Cited

U.S. PATENT DOCUMENTS 2,874,408 A * 2/1959 Vieli ...................... B65D 81/03
 425/363
2,926,720 A * 3/1960 Gosman .............. B29C 66/1122
 156/289
(Continued)

FOREIGN PATENT DOCUMENTS

CN 102815568 A 12/2012
CN 107128066 A 9/2017
 (Continued)

OTHER PUBLICATIONS

"Carpet" published Mar. 2006; 7 pages. (Year: 2006).*
 (Continued)

*Primary Examiner* — Linda L Gray
(74) *Attorney, Agent, or Firm* — Metis IP LLC

(57) ABSTRACT

The present disclosure provides a laminating device. The laminating device may include a first conveying device, a second conveying device, and a laminating apparatus. The first conveying device may be configured to convey a film-like structure. The second conveying device may be arranged along a conveying direction of the first conveying device. A conveying speed of the first conveying device may be greater than that of the second conveying device. The second conveying device may receive the film-like structure conveyed by the first conveying device. The film-like structure may form a folded portion on the second conveying device. The laminating apparatus may be configured to convey an object to be laminated and receive the film-like structure conveyed by the second conveying device. The (Continued)

film-like structure with the folded portion may be laminated with the object to be laminated on the laminating apparatus.

19 Claims, 9 Drawing Sheets

(51) Int. Cl.
  *B32B 37/22* (2006.01)
  *B32B 38/00* (2006.01)
  *B32B 38/18* (2006.01)
(52) U.S. Cl.
  CPC ...... *B32B 38/0004* (2013.01); *B32B 38/1816* (2013.01); *B32B 38/1858* (2013.01); *B32B 2309/14* (2013.01); *B32B 2309/70* (2013.01)

(56)             References Cited

U.S. PATENT DOCUMENTS

| | | | | | |
|---|---|---|---|---|---|
| 3,227,592 | A | * | 1/1966 | Coates | D04H 1/732 |
| | | | | | 425/383 |
| 3,660,204 | A | * | 5/1972 | Wesselmann | B31B 70/00 |
| | | | | | 156/227 |
| 3,679,533 | A | * | 7/1972 | Fukuda | D04H 11/04 |
| | | | | | 156/254 |
| 3,927,875 | A | * | 12/1975 | Winnemoller | B65H 29/66 |
| | | | | | 493/413 |
| 4,111,733 | A | * | 9/1978 | Periers | D04H 1/74 |
| | | | | | 156/227 |
| 4,798,575 | A | * | 1/1989 | Siversson | B65H 45/20 |
| | | | | | 493/347 |
| 4,938,821 | A | * | 7/1990 | Soderlund | A61F 13/15593 |
| | | | | | 156/251 |

FOREIGN PATENT DOCUMENTS

| | | | |
|---|---|---|---|
| CN | 108146054 | A | 6/2018 |
| CN | 108215319 | A | 6/2018 |
| CN | 108973298 | A | 12/2018 |
| CN | 110027341 | A | 7/2019 |
| CN | 111469530 | A | 7/2020 |
| JP | H1120114 | A | 1/1999 |
| WO | 0153015 | A2 | 7/2001 |
| WO | 02053457 | A1 | 7/2002 |
| WO | 2022111431 | A1 | 6/2022 |

OTHER PUBLICATIONS

International Search Report in PCT/CN2021/132240 mailed on Feb. 9, 2022, 4 pages.
Written Opinion in PCT/CN2021/132240 mailed on Feb. 9, 2022, 5 pages.
Office Action in Chinese Application No. 202011330206.2 mailed on Dec. 17, 2021, 22 pages.
The Extended European Search Report in European Application No. 21896932.7 mailed on Mar. 25, 2024, 5 pages.

* cited by examiner

100

300

116

115

1161 1162

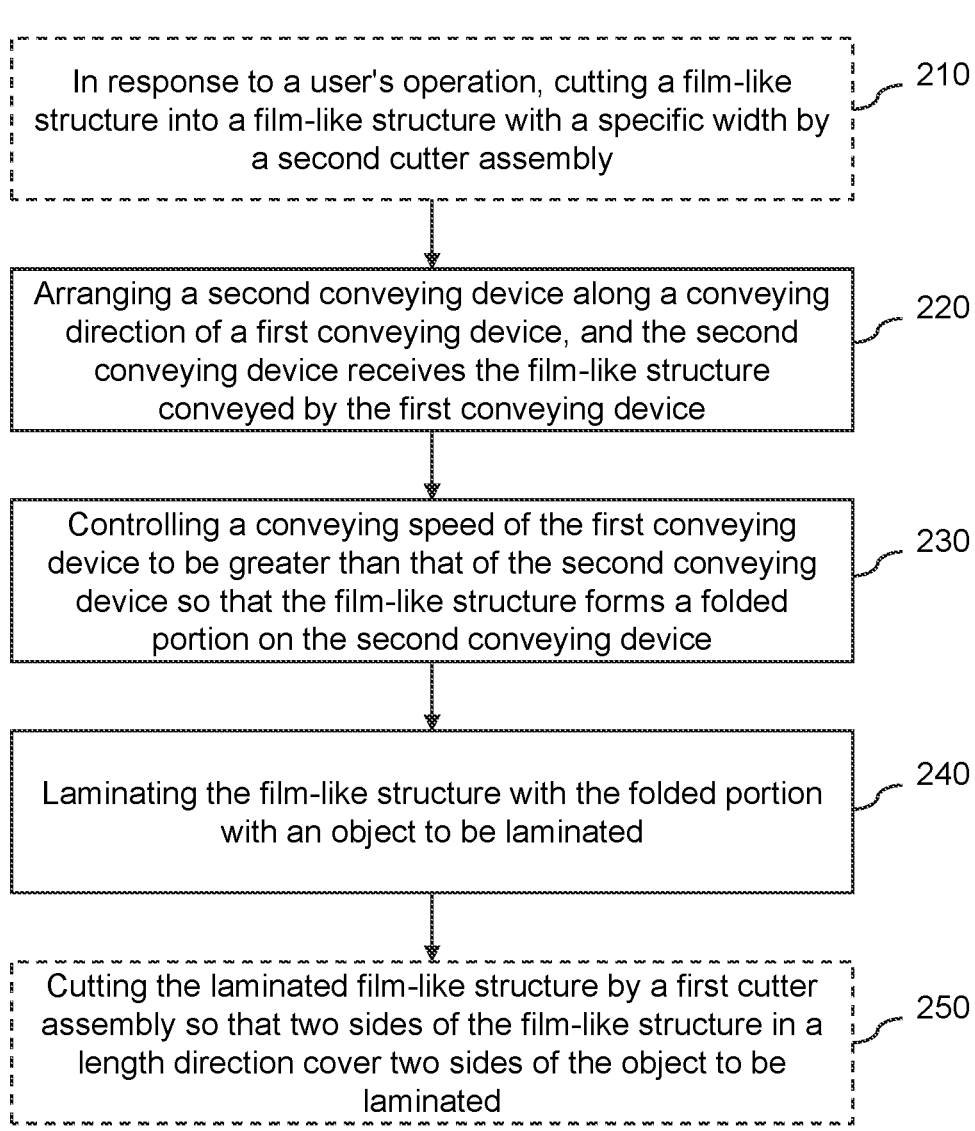

200

In response to a user's operation, cutting a film-like structure into a film-like structure with a specific width by a second cutter assembly — 210

Arranging a second conveying device along a conveying direction of a first conveying device, and the second conveying device receives the film-like structure conveyed by the first conveying device — 220

Controlling a conveying speed of the first conveying device to be greater than that of the second conveying device so that the film-like structure forms a folded portion on the second conveying device — 230

Laminating the film-like structure with the folded portion with an object to be laminated — 240

Cutting the laminated film-like structure by a first cutter assembly so that two sides of the film-like structure in a length direction cover two sides of the object to be laminated — 250

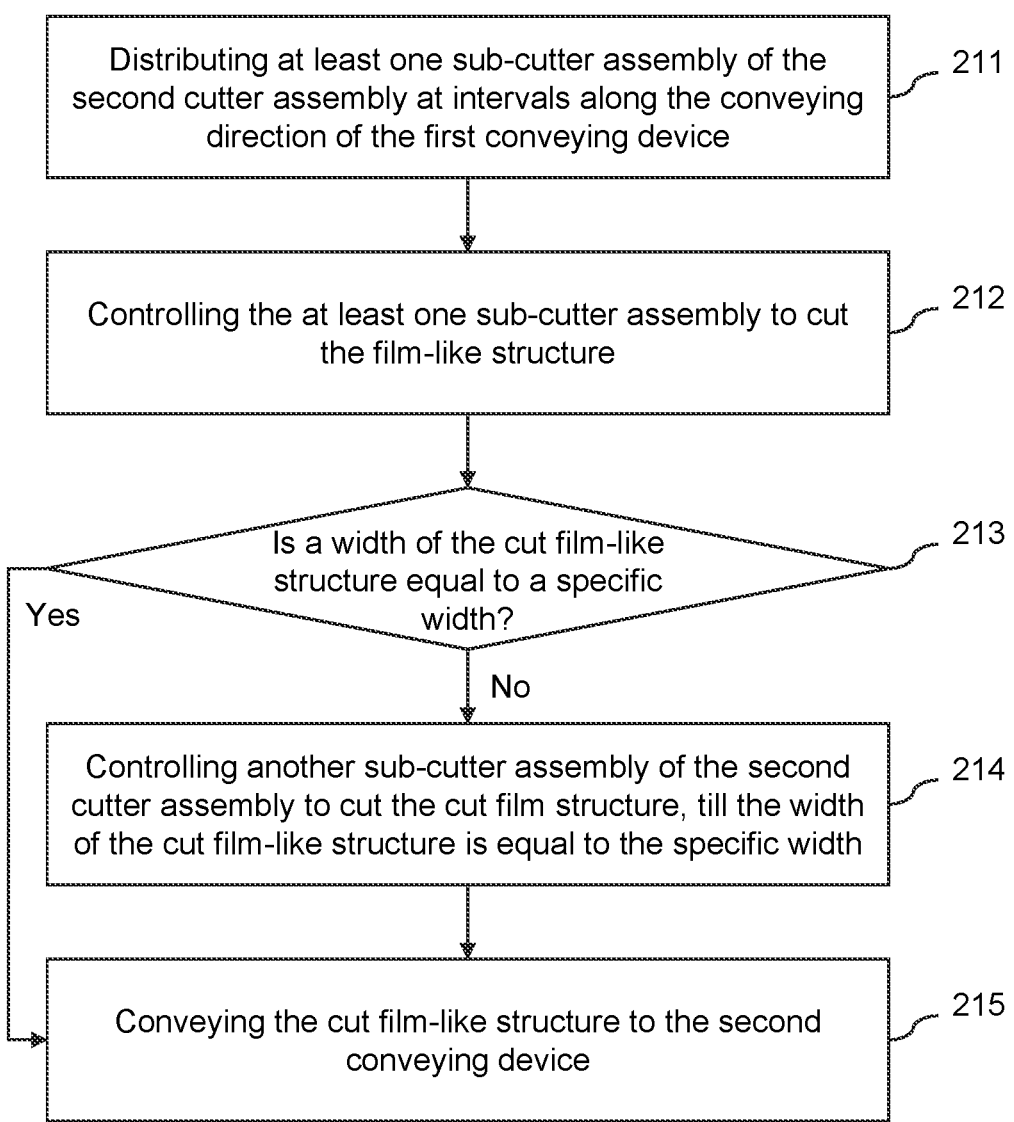

Distributing at least one sub-cutter assembly of the second cutter assembly at intervals along the conveying direction of the first conveying device — 211

Controlling the at least one sub-cutter assembly to cut the film-like structure — 212

Is a width of the cut film-like structure equal to a specific width? — 213

Yes

No

Controlling another sub-cutter assembly of the second cutter assembly to cut the cut film structure, till the width of the cut film-like structure is equal to the specific width — 214

Conveying the cut film-like structure to the second conveying device — 215

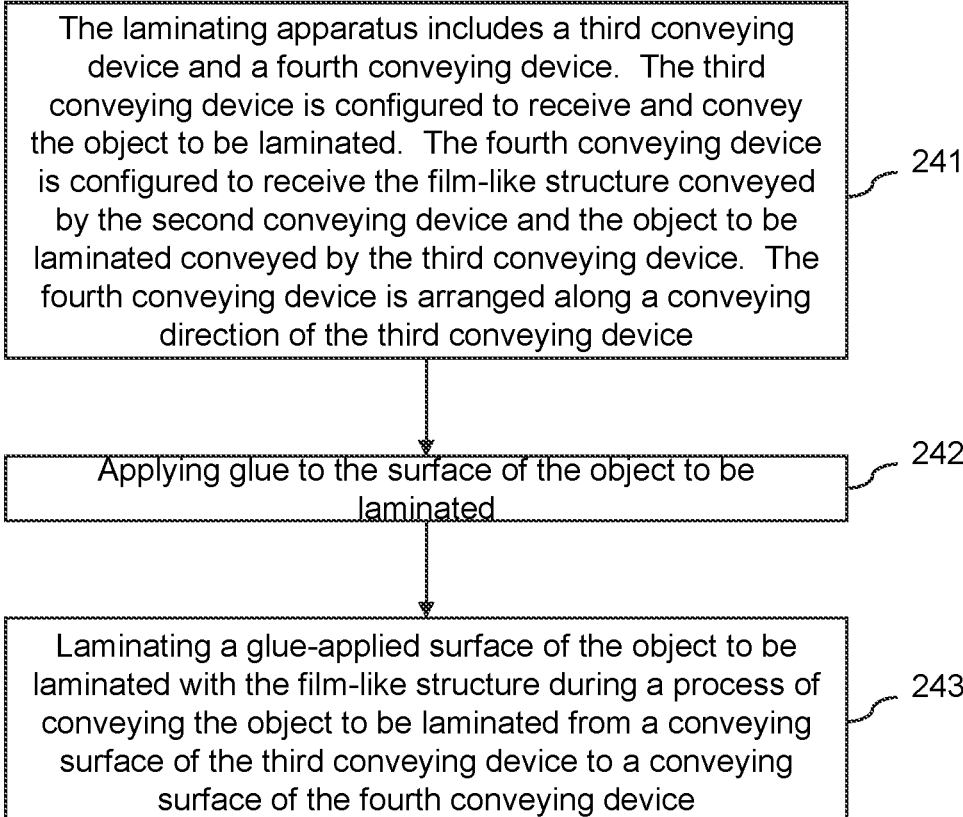

The laminating apparatus includes a third conveying device and a fourth conveying device. The third conveying device is configured to receive and convey the object to be laminated. The fourth conveying device is configured to receive the film-like structure conveyed by the second conveying device and the object to be laminated conveyed by the third conveying device. The fourth conveying device is arranged along a conveying direction of the third conveying device

241

Applying glue to the surface of the object to be laminated

242

Laminating a glue-applied surface of the object to be laminated with the film-like structure during a process of conveying the object to be laminated from a conveying surface of the third conveying device to a conveying surface of the fourth conveying device

METHODS AND DEVICES FOR LAMINATING

CROSS-REFERENCE TO RELATED APPLICATIONS

The present application is a continuation of International Application No. PCT/CN2021/132240, filed on Nov. 23, 2021, which claims priority to Chinese Patent Application No. 202011330206.2, filed on Nov. 24, 2020, the entire contents of each of which are hereby incorporated by reference.

TECHNICAL FIELD

The present disclosure generally relates to the technical field of laminating technology, and more particularly, relates to methods and devices for laminating.

BACKGROUND

Laminating is a common process for the post-press processing of paper prints, which may be used to bond plastic film and printed matter together by using gluing, heating, and pressing to form a paper-plastic product. The laminated printed matter may have an extra layer of thin and transparent plastic film on the surface, and the surface may be smoother and brighter, which can improve the gloss and fastness of the printed matter and prolong the service life of the printed matter. The film can also protect against moisture, water, dirt, abrasion, folding, chemical corrosion, or the like.

The current lamination process is usually the overall lamination of the film and the printed matter. The lamination of the film and the printed matter cannot achieve lamination at a local fixed point or a designated area, and the size of the packaging material formed after the overall lamination is not suitable for the subsequent products that need to be stretch-packed, resulting in that the packaging material cannot meet the requirements for use.

Therefore, it is desirable to provide devices and methods for partial laminating that can meet the requirements of stretch packaging.

SUMMARY

According to an aspect of the present disclosure, a laminating device is provided. The laminating device may include a first conveying device, a second conveying device, and a laminating apparatus. The first conveying device may be configured to convey a film-like structure. The second conveying device may be arranged along a conveying direction of the first conveying device. A conveying speed of the first conveying device may be greater than that of the second conveying device. The second conveying device may receive the film-like structure conveyed by the first conveying device. The film-like structure may form a folded portion on the second conveying device. The laminating apparatus may be configured to convey an object to be laminated and receive the film-like structure conveyed by the second conveying device. The film-like structure with the folded portion may be laminated with the object to be laminated on the laminating apparatus.

In some embodiments, the laminating apparatus may include a third conveying device arranged along a conveying direction of the second conveying device. The third conveying device may be configured to receive and convey the object to be laminated. A conveying surface of the third conveying device may be lower than that of the second conveying device. A height difference between the conveying surface of the second conveying device and the conveying surface of the third conveying device may be greater than a thickness of the object to be laminated.

In some embodiments, the laminating apparatus may further include a fourth conveying device arranged along a conveying direction of the third conveying device. The fourth conveying device may be configured to receive the film-like structure conveyed by the second conveying device and the object to be laminated conveyed by the third conveying device, and laminate the folded portion of the film-like structure and the object to be laminated. A conveying surface of the fourth conveying device may be higher than that of the third conveying device. A height difference between the conveying surface of the third conveying device and the conveying surface of the fourth conveying device may not be greater than the thickness of the object to be laminated.

In some embodiments, the laminating device may further include a plurality of suction assemblies. The plurality of suction assemblies may be distributed at intervals on the conveying surface of the second conveying device. Two adjacent suction assemblies may respectively suction the film-like structure so that the film-like structure forms the folded portion between the two adjacent suction assemblies.

In some embodiments, the plurality of suction assemblies may include at least two rows of openings distributed at intervals along the conveying direction of the second conveying device. A distance between two adjacent rows of openings may not be less than 2 times a length of the folded portion.

In some embodiments, the laminating device may further include a first cutter assembly. A cutting direction of the first cutter assembly may be perpendicular to a conveying direction of the fourth conveying device. The first cutter assembly may be configured to cut the film-like structure on a conveying surface of the fourth conveying device. Two sides of the cut film-like structure in a length direction may cover two sides of the object to be laminated.

In some embodiments, the laminating device may further include a fifth conveying device configured to convey the object to be laminated to the laminating apparatus. A conveying direction of the fifth conveying device may be perpendicular or parallel to that of the laminating apparatus.

In some embodiments, the laminating device may further include a glue application assembly configured to apply glue to a surface of the object to be laminated on a conveying surface of the fifth conveying device.

In some embodiments, the glue application assembly may include a glue tank and a glue roller. The glue tank may be configured to store the glue. The glue roller may be configured to apply the glue in the glue tank to the surface of the object to be laminated on the conveying surface of the fifth conveying device.

In some embodiments, the laminating device may further include a second cutter assembly configured to cut the film-like structure received or conveyed by the first conveying device into a film-like structure with a specific width. The second cutter assembly may include at least one sub-cutter assembly. The at least one sub-cutter assembly may be distributed at intervals along the conveying direction of the first conveying device.

In some embodiments, the at least one sub-cutter assembly may include a first sub-cutter assembly and a second sub-cutter assembly. The first sub-cutter assembly and the second sub-cutter assembly may be distributed at intervals along the conveying direction of the first conveying device. A cutter corresponding to the second sub-cutter assembly and a cutter corresponding to the first sub-cutter assembly may be distributed at intervals along a width direction of the first conveying device.

According to an aspect of the present disclosure, a laminating method is provided. The laminating method may include arranging a second conveying device along a conveying direction of a first conveying device. The second conveying device may be configured to receive a film-like structure conveyed by the first conveying device. The laminating method may include controlling a conveying speed of the first conveying device to be greater than that of the second conveying device so that the film-like structure forms a folded portion on the second conveying device. The laminating method may further include laminating the film-like structure with the folded portion with an object to be laminated.

In some embodiments, a length of the folded portion of the film-like structure formed on the second conveying device may be related to the conveying speed of the first conveying device and the conveying speed of the second conveying device.

In some embodiments, the controlling a conveying speed of the first conveying device to be greater than that of the second conveying device so that the film-like structure forms a folded portion on the second conveying device may include controlling at least one of the length and a position of the folded portion by adjusting at least one of the conveying speed of the first conveying device and the conveying speed of the second conveying device.

In some embodiments, the controlling a conveying speed of the first conveying device to be greater than that of the second conveying device so that the film-like structure forms a folded portion on the second conveying device may further include suctioning the film-like structure using a plurality of suction assemblies distributed at intervals on a conveying surface of the second conveying device. Two adjacent suction assemblies may respectively suction the film-like structure so that the film-like structure forms the folded portion between the two adjacent suction assemblies.

In some embodiments, the laminating the film-like structure with the folded portion with an object to be laminated may include applying glue to a surface of the object to be laminated and conveying the glue-applied object to be laminated to a laminating apparatus. The laminating apparatus may include a third conveying device configured to receive the object to be laminated and a fourth conveying device configured to receive the film-like structure. The fourth conveying device may be arranged along a conveying direction of the third conveying device. The laminating the film-like structure with the folded portion with an object to be laminated may further include laminating a glue-applied surface of the object to be laminated with the film-like structure during a process of conveying the object to be laminated from a conveying surface of the third conveying device to a conveying surface of the fourth conveying device.

In some embodiments, the laminating method may further include cutting the laminated film-like structure using a first cutter assembly. Two sides of the cut film-like structure in a length direction may cover two sides of the object to be laminated.

In some embodiments, before controlling a conveying speed of the first conveying device to be greater than that of the second conveying device so that the film-like structure forms a folded portion on the second conveying device, the laminating method may include in response to a user's operation, cutting the film-like structure into a film-like structure with a specific width using a second cutter assembly.

In some embodiments, the second cutter assembly may include at least one sub-cutter assembly. The at least one sub-cutter assembly may be distributed at intervals along the conveying direction of the first conveying device. The laminating method may include controlling the at least one sub-cutter assembly of the second cutter assembly to cut the film-like structure, determining whether a width of the cut film-like structure is equal to a specific width; and in response to determining that the width of the cut film-like structure is not equal to the specific width, controlling another sub-cutter assembly of the second cutter assembly to cut the cut film structure, till the width of the cut film-like structure is equal to the specific width.

According to an aspect of the present disclosure, an electronic device is provided. The electronic device may include at least one processor and a memory communicatively connected to the at least one processor. The memory may store instructions executable by the at least one processor. When executed by the at least one processor, the instructions may cause the at least one processor to perform the laminating method.

According to an aspect of the present disclosure, a computer storage medium is provided. The computer storage medium may store a computer program for executing the laminating method.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 7 is a flowchart illustrating an exemplary laminating method according to some embodiments of the present disclosure;

FIG. 8 is a flowchart illustrating an exemplary process for cutting a film-like structure into a film-like structure with a specific width by a second cutter assembly according to some embodiments of the present disclosure; and FIG. 9 is a flowchart illustrating an exemplary process for laminating the folded portion of the film-like structure with the object to be laminated according to some embodiments of the present disclosure.

DETAILED DESCRIPTION

Figure 1:
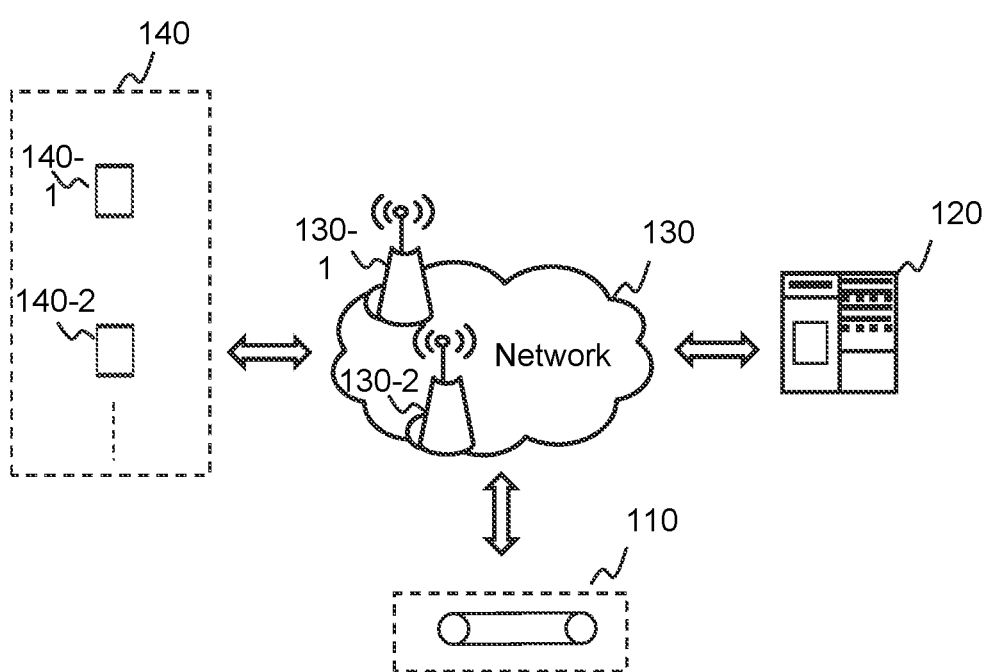
FIG. 1 is a schematic diagram illustrating an application scenario of an exemplary laminating system according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the term "system," "device," "unit," and/or "module" used herein are one method to distinguish different components, elements, parts, sections or assembly of different levels in ascending order. However, the terms may be displaced by another expression if they achieve the same purpose.

It will be understood that, although the terms "first," "second," etc., may be used herein to describe various elements, these elements should not be limited by these terms. These terms are only used to distinguish one element from another. Similarly, the singular forms "a," "an," and "the" may be intended to include the plural forms as well, unless the context clearly indicates otherwise. For the convenience of describing this specification and simplifying the description, the terms "front," "rear," "under," and/or "above" are used to indicate the orientation or positional relationship of the device or element based on the drawings, rather than indicating or implying that the device or element must have the specific orientation or be constructed or operated in the specific orientation, which cannot be understood as a limitation of the present disclosure. In general, the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Some embodiments of the present disclosure provide a laminating device. In some embodiments, the laminating device may include a first conveying device, a second conveying device arranged along a conveying direction of the first conveying device, and a laminating apparatus. The first conveying device may be configured to convey a film-like structure. The second conveying device may receive the film-like structure conveyed by the first conveying device. In some embodiments, a conveying speed of the first conveying device may be greater than that of the second conveying device. The difference in speed between the first conveying device and the second conveying device may cause the film-like structure to form a folded portion on the second conveying device. Further, the laminating apparatus may be configured to convey an object to be laminated and receive the film-like structure with the folded portion conveyed by the second conveying device, so that the folded portion of the film-like structure and the object to be laminated may be laminated on the laminating apparatus. On one hand, the laminated material may be used in a conventional packaging process. For example, the laminated material may be packaged in a form of a folding wrapper or a twist wrapper. On the other hand, a space for placing products may be formed between the laminated material and the folded portion of the film-like structure, so that the laminated material and the film-like structure may be suitable for packaging forms of products such as stretching packaging, shrink packaging, blister packaging, skin packaging, or the like. In summary, the laminating device provided by the present disclosure can fold the film-like structure into a structure with a folded portion and laminate it with the object to be laminated, which may improve the production efficiency of packaging materials and enable the produced packaging materials to be used in different packaging scenarios, thereby increasing the utilization rate of packaging materials.

FIG. 1 is a schematic diagram illustrating an application scenario of an exemplary laminating system according to some embodiments of the present disclosure. In some embodiments, the laminating system 100 may include a laminating device 110, a processing device 120, and a terminal 140. The laminating device 110, the terminal 140, and the processing device 120 may be communicatively connected through a network 130.

The laminating device 110 may be configured to form a folded portion on the film-like structure and laminate the film-like structure with the folded portion with the object to be laminated. In some embodiments, the laminating device 110 may include a first conveying device, a second conveying device arranged along a conveying direction of the first conveying device, and a laminating apparatus. The first conveying device may be configured to convey the film-like structure. The second conveying device may receive the film-like structure conveyed by the first conveying device. In some embodiments, an operating speed (i.e., the conveying speed) of the first conveying device may be greater than that of the second conveying device. The difference in speed between the first conveying device and the second conveying device may cause the film-like structure to form a folded portion on the second conveying device. Optionally, the operating speed of the first conveying device and the operating speed of the second conveying device may be dynamically adjusted, so that the position of the folded portion on the second conveying device may be controlled. It should be understood that the position of the folded portion may be controlled in other ways. For example, the position of the folded portion may be controlled by setting a suction assembly on the second conveying device. The laminating apparatus may be configured to convey an object to be laminated and receive the film-like structure with the folded portion conveyed by the second conveying device. More descriptions regarding the laminating device 110 may be found elsewhere in the present disclosure, for example, FIGS. 3-6 and the descriptions thereof.

The processing device 120 may be configured to process information and/or data related to the laminating device 110. For example, the processing device 120 may calculate the operating speed of the conveying device (e.g., the first conveying device 111 and the second conveying device 112 shown in FIG. 3) of the laminating device 110 according to a target length of the folded portion 1151 (shown in FIG. 4 or FIG. 5) based on a preset algorithm. As another example, the processing device 120 may calculate the operating speed of the conveying device of the laminating device 110 according to a target position of the folded portion 1151 based on the preset algorithm. As another example, the processing device 120 may control the start and stop of the suction assembly 1121 (shown in FIG. 4) based on the target length and the target position of the folded portion 1151. In some embodiments, the processing device 120 may include one or more processing engines (e.g., single-core processing engine(s) or multi-core processing engine(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The terminal 140 may be a device with data acquisition, storage, and/or sending functions, for example, a laptop computer. The terminal 140 may include a control system and/or a control program, and the user may perform various operations on the application to realize data processing of the processing device 120 and the laminating device 110. In some embodiments, the terminal 140 may include, but is not limited to, a mobile device 140-1, a tablet computer 140-2, a laptop computer, a desktop computer, or the like, or any combination thereof. Exemplary mobile device 140-1 may include but is not limited to, a smartphone, a personal digital assistance (PDA), a point of sale (POS) device, a handheld gaming device, smart glasses, a smartwatch, a wearable device, a virtual reality device, an augmented reality device, or the like, or any combination thereof. In some embodiments, the terminal 140 may obtain operating data from the laminating device 110. For example, the terminal 140 may obtain the actual operating speed of the conveying device from the laminating device 110. In some embodiments, the terminal 140 may obtain control data from the processing device 120. For example, the terminal 140 may obtain a control instruction for controlling the laminating device 110 (e.g., an instruction for controlling the operating speed of the first conveying device and the operating speed of the second conveying device) from the processing device 120. As another example, the terminal 140 may obtain a control instruction for controlling the first cutter assembly 11321 (shown in FIG. 5) (e.g., an instruction for controlling the start and stop of the first cutter assembly 11321) from the processing device 120. As another example, the terminal 140 may obtain a control instruction for controlling the second cutter assembly (shown in FIG. 6) (e.g., an instruction for controlling the start and stop of at least one sub-cutter assembly of the second cutter assembly) from the processing device 120. In some embodiments, the terminal 140 may receive a user's instruction and transmit the instruction to the processing device 120, thereby controlling the operating state (e.g., the operating speed of the conveying device, the start and stop of the cutter assembly and/or the suction assembly) of the laminating device 110.

The network 130 may facilitate the exchange of information and/or data. In some embodiments, one or more components of the laminating device 110, the processing device 120, and the terminal 140 may send information and/or data to or receive information and/or data from one or more other components via the network 150. For example, the terminal 140 may obtain the actual operating speed of the conveying device from the laminating device 110 via the network 130. As another example, the processing device 120 may send a control instruction for controlling the first cutter assembly 11321 (e.g., an instruction for controlling the start and stop of the first cutter assembly 11321) to the terminal 140 via the network 130. As another example, the processing device 120 may send a control instruction for controlling the second cutter assembly (e.g., an instruction for controlling the start and stop of at least one sub-cutter assembly of the second cutter assembly) to the terminal 140 via the network 130. The network 130 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 130 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 130 may include one or more network access points. For example, the network 130 may include wired and/or wireless network access points such as base stations and/or internet exchange points 130-1, 130-2, . . . , through which one or more components of the laminating device 110, the processing device 120, and the terminal 140 may be connected to the network 130 to exchange data and/or information.

Figure 2:
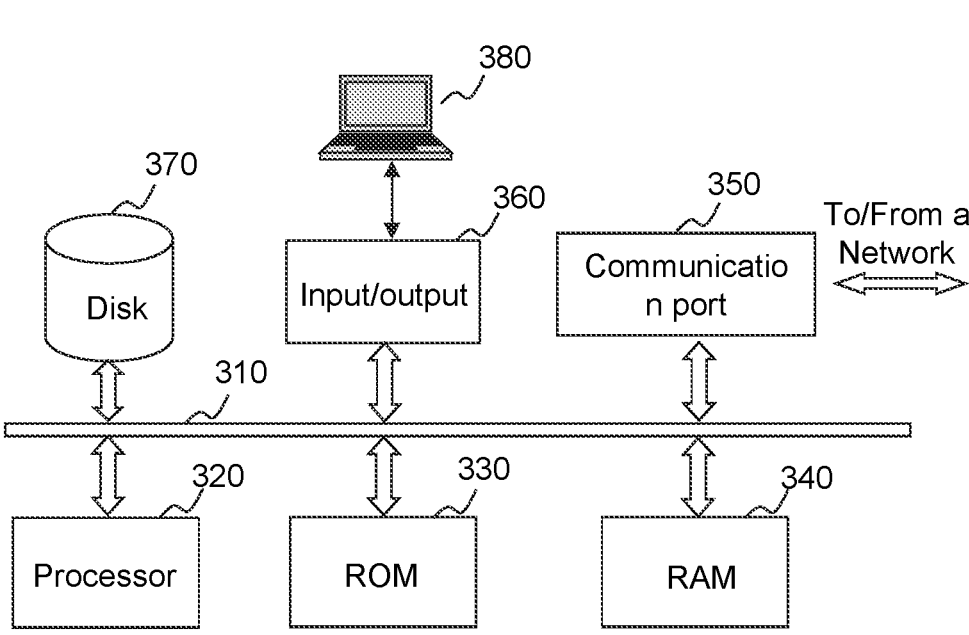
FIG. 2 is a schematic diagram illustrating an exemplary computing device according to some embodiments of the present disclosure.

FIG. 2 is a schematic diagram illustrating an exemplary computing device according to some embodiments of the present disclosure. As shown in FIG. 2, the computing device 300 may include at least one processor 320, at least one storage, a bus 310, a communication port 350, and an input/output (I/O) 360. The storage may store instructions that can be executed by the at least one processor 320. When executed by the at least one processor 320, the instructions may direct the at least one processor 320 to perform the laminating method 200 described in the present disclosure. In some embodiments, the at least one processor 320, the at least one storage, the communication port 350, and the input/output 360 may establish a communication connection through the communication bus 310.

In some embodiments, instructions may include, for example, routines, programs, objects, components, data structures, procedures, modules, and functions that can perform specific functions described in the present disclosure. For example, the processor 320 may receive information from the terminal 140 and send the processed information to the laminating device 110.

In some embodiments, the at least one processor 320 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

The storage/computer storage medium may store data/information/instructions obtained from one or more components of the laminating system 100. In some embodiments, the storage may include a read-only memory (ROM) 330, a random access memory (RAM) 340, a disk 370, a removable storage device, a volatile read-and-write memory, or the like, or any combination thereof. In some embodiments, the storage/computer storage medium may store at least one program and/or instruction to execute the exemplary laminating method 200 described in the present disclosure. For example, the storage/computer storage medium may store a program executed by the processor 320 to control the operating speeds of the second conveying device 112 and the first conveying device 111 according to the length of the folded portion 1151. As another example, the storage/computer storage medium may store a program executed by the processor 320 to control the first cutter assembly 11321 to cut the film-like structure 115. In some embodiments, the storage/computer storage medium may be implemented on a cloud platform.

The communication port 350 may be connected with a network (e.g., the network 130) to facilitate data communications. The communication port 350 may establish connections between the terminal 140 and the at least one processor 320. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth™ network, a Wi-Fi network, a WiMax network, a WLAN, a ZigBee™ network, an NFC network, a mobile network (e.g., 3G, 4G, 5G, etc.), or the like, or any combination thereof. In some embodiments, the communication port 350 may be a standardized communication port, such as RS232, RS485, etc. In some embodiments, the communication port 350 may be a specially designed communication port.

The input/output 360 may input or output signals, data, information, or the like. In some embodiments, the input/output 360 may enable user interaction with the at least one processor 320. In some embodiments, the input/output 360 may establish a communication connection with an external device 380. In some embodiments, the input/output 360 may include an input device and an output device. The input device may include alphanumeric keys and other keys, which may be input via a keyboard, a touch screen (e.g., a screen with tactile or tactile feedback), a voice input, an eye-tracking input, a brain monitoring system, or other similar arbitrary input mechanisms. The input information received through the input device 380 may be transmitted to another component for further processing through, for example, the communication bus. Other types of input devices may include cursor control devices, such as a mouse, a trackball, or cursor direction keys. Exemplary output devices may include a display device, a loudspeaker, a printer, a projector, or the like, or any combination thereof. Exemplary display devices may include a liquid crystal display (LCD), a light-emitting diode (LED)-based display, a flat panel display, a curved screen, a television device, a cathode ray tube (CRT), or the like, or any combination thereof. In some embodiments, input/output 360 may be omitted.

Figure 3:
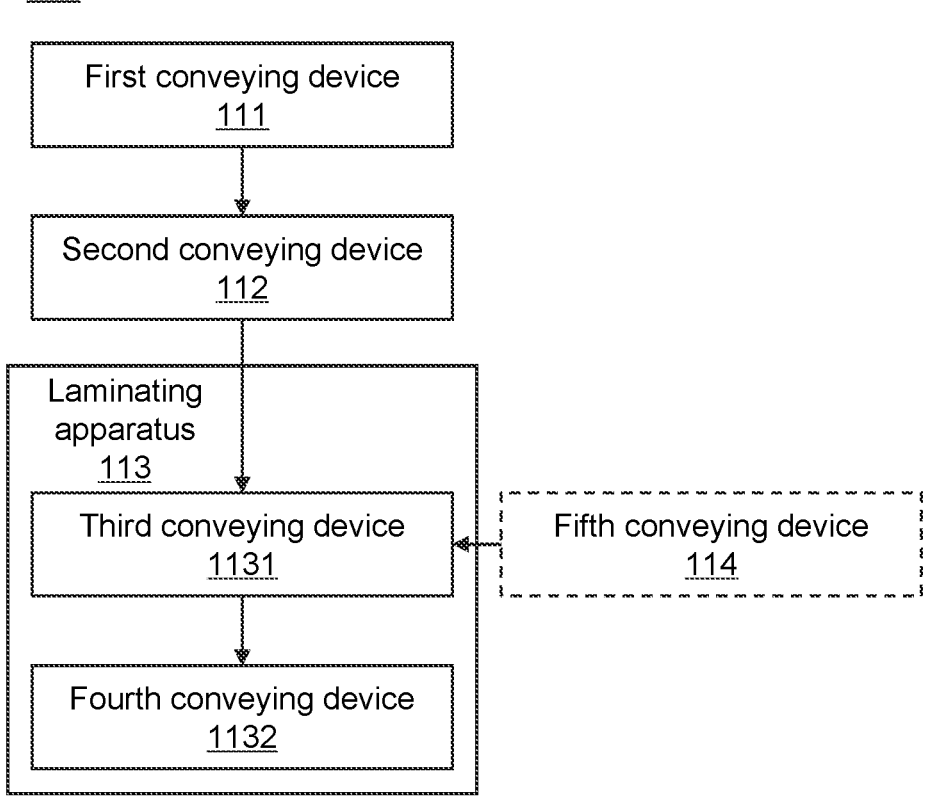
FIG. 3 is a block diagram illustrating an exemplary structure of a laminating device according to some embodiments of the present disclosure.

FIG. 3 is a block diagram illustrating an exemplary structure of a laminating device according to some embodiments of the present disclosure. As shown in FIG. 3, the laminating device 110 may include a first conveying device 111, a second conveying device 112, and a laminating apparatus 113.

The first conveying device 111 may be configured to convey a film-like structure. In some embodiments, the material of the film-like structure may include, but is not limited to, one or more of polyvinyl chloride, polyethylene, polypropylene, polystyrene, metal (e.g., aluminum, tin), or the like. In some embodiments, the film-like structure may include an optical film, a composite film, a superconducting film, or any other possible film structure. The first conveying device 111 may include a conveying surface. When the first conveying device 111 is running, the film-like structure may be placed on the conveying surface of the first conveying device 111 and conveyed from a starting point of the first conveying device 111 to an end point of the first conveying device 111. The second conveying device 112 may be configured to receive the film-like structure conveyed by the first conveying device 111. In some embodiments, the second conveying device 112 may be arranged along a conveying direction of the first conveying device 111. It can be understood that the conveying direction of the first conveying device 111 and the conveying direction of the second conveying device 112 may be the same. Specifically, a starting point of the second conveying device 112 may be close to the end point of the first conveying device 111 so that the film-like structure conveyed by the end point of the first conveying device 111 may enter the starting point of the second conveying device 112. In some embodiments, a height of the conveying surface of the second conveying device 112 may be the same as that of the conveying surface of the first conveying device 111. In some embodiments, the height of the conveying surface of the second conveying device 112 may also be different from that of the conveying surface of the first conveying device 111. The height of the conveying surface may be a height of the conveying device relative to the horizontal plane. The height of the conveying surface of the second conveying device 112 and the height of the conveying surface of the first conveying device 111 may be adjusted adaptively according to the production site. In order to make the film-like structure generate the folded portion on the second conveying device 112, in some embodiments, the conveying speed of the first conveying device 111 may be greater than that of the second conveying device 112. Correspondingly, the conveying speed of the film-like structure on the first conveying device 111 may be greater than that of the film-like structure on the second conveying device 112. Since the film-like structure is a continuous flexible structure, the film-like structure with a faster speed on the first conveying device 111 may act on the film-like structure with a slower speed on the second conveying device 112, so that the film-like structure may form the folded portion on the second conveying device 112. The folded portion refers to an area that the film-like structure partially overlaps with the main body. In some embodiments, the folded portion may have a structure with two layers, three layers, four layers, or more layers. In some embodiments, the length of each layer of the folded portion may be the same or different. It should be noted that the count of layers of the folded portion or the length of each layer of the folded portion may be adjusted adaptively according to actual application scenarios. More descriptions regarding the folded portion may be found elsewhere in the present disclosure, for example, FIG. 4, FIG. 5, and FIG. 7, and the descriptions thereof.

The laminating apparatus 113 may be configured to convey the object to be laminated and receive the film-like structure conveyed by the second conveying device 112. The film-like structure with the folded portion may be laminated with the object to be laminated on the laminating apparatus 113. The object to be laminated refers to a plate-shaped structure that can be used to carry objects. In some embodiments, the object to be laminated, classified in terms of material, may include a paperboard, a plastic plate, a metal plate, a rubber plate, or the like, or any combination thereof. In some embodiments, the laminating apparatus 113 may include a third conveying device 1131 arranged along the conveying direction of the second conveying device 112. The third conveying device 1131 may be configured to receive and convey the object to be laminated. The object to be laminated received by the third conveying device 1131 may be conveyed to other sub-devices of the laminating apparatus 113 to complete the laminating with the film-like structure with the folded portion. In some embodiments, the laminating apparatus 113 may include a fourth conveying device 1132 arranged along the conveying direction of the third conveying device 1131. The fourth conveying device 1132 may be configured to receive the film-like structure conveyed by the second conveying device 112 and the object to be laminated conveyed by the third conveying device 1131 and laminate the film-like structure with the folded portion with the object to be laminated. In order to prevent the entering of the object to be laminated to the third conveying device 1131 from affecting the normal conveyance of the film-like structure between the second conveying device 112 and the fourth conveying device, in some embodiments, the conveying surface of the third conveying device 1131 may be lower than that of the second conveying device 112. A height difference between the conveying surface of the second conveying device 112 and the conveying surface of the third conveying device 1131 may be greater than a thickness of the object to be laminated. In order to realize the lamination between the film-like structure and the object to be laminated, in some embodiments, the conveying surface of the fourth conveying device 1132 may be higher than that of the conveying surface of the third conveying device 1131. A height difference between the conveying surface of the third conveying device 1131 and the conveying surface of the fourth conveying device 1132 may not be greater than the thickness of the object to be laminated. When the object to be laminated on the conveying surface of the third conveying device 1131 is conveyed to the conveying surface of the fourth conveying device 1132, since the height difference between the conveying surface of the third conveying device 1131 and the conveying surface of the fourth conveying device 1132 is not greater than the thickness of the object to be laminated, the object to be laminated may be pressed by the conveying surface of the fourth conveying device 1131 and the film-like structure to realize the lamination between a side of the film-like structure facing the fourth conveying device 1132 and a side of the object to be laminated away from the fourth conveying device 1132. It should be understood that the third conveying device 1131 and the fourth conveying device 1132 may be two independent conveying devices or may be different components of one conveying device.

In some embodiments, the laminating device 110 may further include a fifth conveying device 114. The fifth conveying device 114 may be configured to convey the object to be laminated to the third conveying device 1131 of the laminating apparatus 113. In some embodiments, the conveying direction of the fifth conveying device 114 may be perpendicular to that of the third conveying device 1131. In some embodiments, the conveying surface of the fifth conveying device 114 may be lower than, higher than, or equal to the conveying surface of the third conveying device 1131. When the object to be laminated on the conveying surface of the fifth conveying device 114 is separated from the conveying surface of the fifth conveying device 114 at an end point, the object to be laminated will continue to move along the conveying direction of the fifth conveying device 114 due to the inertia of the object to be laminated, thereby being conveyed to the conveying surface of the third conveying device 1131. In some embodiments, the conveying direction of the fifth conveying device 114 may also be the same as that of the third conveying device 1131, where the fifth conveying device 114 may be located on a side of the third conveying device 1131 away from the starting point of the fourth conveying device 1132. The object to be laminated on the fifth conveying device 114 may be conveyed to the starting point of the third conveying device 1131 from the end point of the fifth conveying device 114. In some embodiments, the fifth conveying device 114 and the third conveying device 1131 may be two independent conveying devices or may be different components of one conveying device. Correspondingly, the third conveying device 1131, the fourth conveying device 1132, and the fifth conveying device 114 may be independent conveying devices or may be different components of one conveying device.

It should be noted that the above descriptions about the laminating device are merely provided for the purposes of illustration, and not intended to limit the scope of the present disclosure. Apparently, for persons having ordinary skills in the art, multiple variations and modifications may be conducted under the teachings of the present disclosure. For example, in some embodiments, the fifth conveying device 114 may be omitted from the laminating device 110, and the object to be laminated may be placed on the conveying surface of the third conveying device 1131 manually or by other equipment (e.g., an industrial robot, a robotic arm, or the like). However, those variations and modifications do not depart from the scope of the present disclosure.

In order to make the film-like structure on the second conveying device 112 form folded portions at specific intervals along a length direction of the film-like structure, in some embodiments, the laminating device 110 may further include at least two suction assemblies. The at least two suction assemblies may be distributed at intervals along the conveying direction of the second conveying device 112. Two adjacent suction assemblies may respectively suction the film-like structure so that the film-like structure forms the folded portion between the two adjacent suction assemblies.

Figure 4:
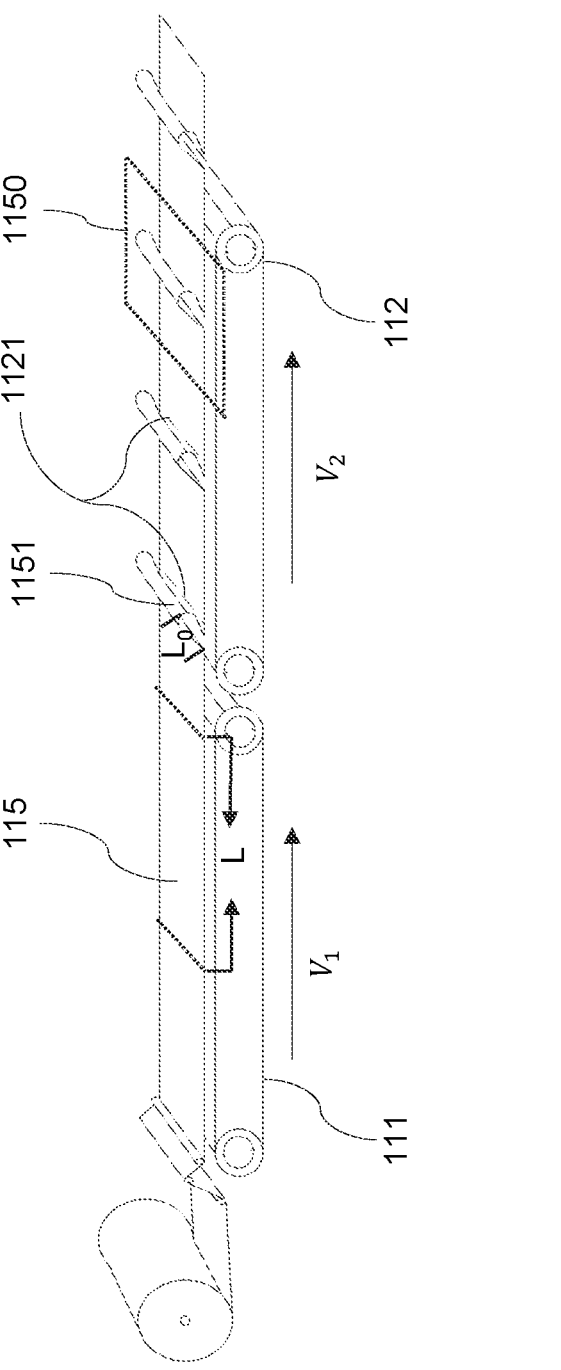
FIG. 4 is a schematic diagram illustrating an exemplary structure of a first conveying device and a second conveying device according to some embodiments of the present disclosure.

FIG. 4 is a schematic diagram illustrating an exemplary structure of a first conveying device and a second conveying device according to some embodiments of the present disclosure.

As shown in FIG. 4, in some embodiments, the laminating device 110 may further include at least two suction assemblies 1121. The at least two suction assemblies 1121 may be distributed at intervals along the conveying direction of the second conveying device 112. Two adjacent suction assemblies 1121 may respectively suction the film-like structure 115 so that the film-like structure 115 forms the folded portion 1151 between the two adjacent suction assemblies. When the film-like structure 115 is conveyed from the first conveying device 111 to the second conveying device 112, a part of the film-like structure 115 may be suctioned on the conveying surface of the second conveying device 112 by the suction assembly 1121. The part of the film-like structure 115 may be conveyed along with the conveying surface of the second conveying device 112 at the conveying speed of the second conveying device 112, and the first conveying device 111 may continue to convey the film-like structure 115 to the second conveying device 112. Since the conveying speed of the conveying device 111 is greater than that of the second conveying device 112, the film-like structure 115 separated from the first conveying device 111 may move in the conveying direction of the second conveying device 112 at a speed same as the conveying speed of the first conveying device 111. The film-like structure 115 separated from the first conveying device 111 may protrude upward relative to the film structure 115 suctioned by the suction assembly 1121 and maintain a certain speed to continue moving in the conveying direction of the second conveying device 112. The protruding part of the film-like structure 115 may be attached to the main structure of the film-like structure 115 under gravity to form a folded portion 1151. The part of the film-like structure 115 after the folded portion 1151 may be suctioned by the adjacent suction assembly 1121 and then stops being folded. By analogy, the subsequent film-like structure 115 may form a film-like structure 115 with folded portions 1151 with specific intervals under the action of the suction assembly 1121. In some embodiments, the suction assembly 1121 may include at least two rows of openings (not shown in FIG. 4) distributed along the conveying direction of the second conveying device 112. The openings may pass through the conveying surface of the second conveying device 112. Each of the openings may be connected with an external power device (e.g., an air pump) to suction the film-like structure 115. When the first cutter assembly 11321 cuts the film-like structure 115, in order to prevent the first cutter assembly 11321 (shown in FIG. 5) from cutting the folded portion 1151 lying on the film-like structure 115, in some embodiments, the distance between two adjacent rows of openings may not be less than twice the length of the folded portion 1151, that is, the distance between the openings of two adjacent suction assemblies 1121 may be greater than or equal to a spread length of the folded portion 1151. The folded portion 1151 lying on the film-like structure 115 will not cover the cross-cut position of the first cutter assembly 11321 so that damage to the laminated packaging material can be avoided. In some embodiments, a shape of the opening may include but is not limited to, a circle, a triangle, an ellipse, or a polygon. In some embodiments, the distance between two adjacent rows of openings refers to a distance between the centers of the two rows of openings. For example, when the openings are circular openings, the distance between two adjacent rows of openings may be the distance between the centers of the two rows of circles. For illustrative purposes only, the film-like structure 115 with the folded portion 1151 may need to be laminated with each object to be laminated. In order to ensure that each object to be laminated can be laminated with the film-like structure 115 with the folded portion 1151, the folded portion 1151 and the film-like structures 115 on both sides of the folded portion 1151 may be regarded as a film-like structure unit 1150. A spread length of a film-like structure unit 1150 may be denoted as L, and the folded portion 1151 may be approximately regarded as a symmetrical structure about the folded position. $L_0$ denotes the length of a single-layer of the folded portion 1151, and correspondingly, the spread length of the folded portion 1151 may be $2L_0$. In some embodiments, the suction assembly 1121 may include a plurality of openings arranged side by side along the length direction of the conveying surface of the second conveying device 112, and the distance between the corresponding openings of the adjacent suction assemblies 1121 may be greater than or equal to $2L_0$. In order to achieve a better suction effect, each suction assembly 1121 may include a plurality of openings arranged at intervals along the width direction of the conveying surface of the second conveying device 112. It should be noted that the structure of the folded portion 1151 is not limited to the structure with two layers shown in FIG. 4, but can also be the structure with three layers, four layers, or more layers. The distance between adjacent suction assemblies 1121 may be adjusted according to the count of layers of the folded portion 1151.

Figure 5:
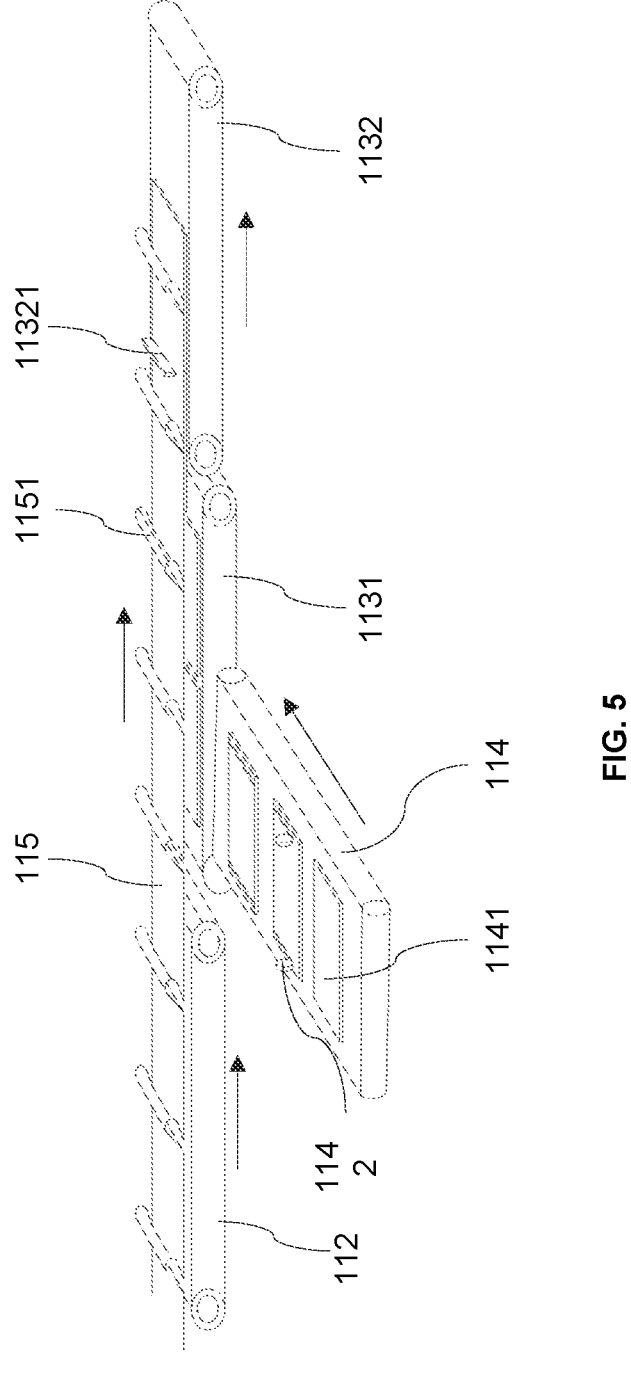
FIG. 5 is a schematic diagram illustrating an exemplary partial structure of a laminating device according to some embodiments of the present disclosure.

FIG. 5 is a schematic diagram illustrating an exemplary partial structure of a laminating device according to some embodiments of the present disclosure.

In some embodiments, the third conveying device 1131 may be configured to receive and convey the object to be laminated. The object to be laminated received by the third conveying device 1131 may be conveyed to other sub-devices of the laminating apparatus 113 to complete the laminating with the film-like structure with the folded portion. In some embodiments, the laminating apparatus 113 may include a fourth conveying device 1132 arranged along the conveying direction of the third conveying device 1131. The fourth conveying device 1132 may be configured to receive the film-like structure conveyed by the second conveying device 112 and the object to be laminated conveyed by the third conveying device 1131 and laminate the film-like structure with the folded portion with the object to be laminated. In order to prevent the entering of the object to be laminated to the third conveying device 1131 from affecting the normal conveyance of the film-like structure between the second conveying device 112 and the fourth conveying device, in some embodiments, the conveying surface of the third conveying device 1131 may be lower than that of the second conveying device 112. A height difference between the conveying surface of the second conveying device 112 and the conveying surface of the third conveying device 1131 may be greater than a thickness of the object to be laminated. In order to realize the lamination between the film-like structure and the object to be laminated, in some embodiments, the conveying surface of the fourth conveying device 1132 may be higher than that of the conveying surface of the third conveying device 1131. A height difference between the conveying surface of the third conveying device 1131 and the conveying surface of the fourth conveying device 1132 may not be greater than the thickness of the object to be laminated. When the object to be laminated on the conveying surface of the third conveying device 1131 is conveyed to the conveying surface of the fourth conveying device 1132, since the height difference between the conveying surface of the third conveying device 1131 and the conveying surface of the fourth conveying device 1132 is not greater than the thickness of the object to be laminated, the object to be laminated may be pressed by the conveying surface of the fourth conveying device 1131 and the film-like structure to realize the lamination between a side of the film-like structure facing the fourth conveying device 1132 and a side of the object to be laminated away from the fourth conveying device 1132. It should be understood that the third conveying device 1131 and the fourth conveying device 1132 may be two independent conveying devices or may be different components of one conveying device.

In some embodiments, the fourth conveying device 1132 may include a pressurizing component (not shown). The pressurizing component may be located above the conveying surface of the fourth conveying device 1132. The pressurizing component may apply pressure to the film-like structure 115 and the object to be laminated 1141 on the conveying surface of the fourth conveying device 1132 so that the film-like structure 115 and the object to be laminated 1141 may be tightly laminated. In some embodiments, the pressurizing component may apply vertical downward pressure to the film-like structure 115 and the object to be laminated 1141. For example, the pressurizing component may be a hydraulic device that reciprocates up and down. In some embodiments, the pressurizing component may be a roller device.

As shown in FIG. 5, the laminating device 110 may further include a first cutter assembly 11321. The first cutter assembly 11321 may be configured to cut the film-like structure 115 on the conveying surface of the fourth conveying device 1132. Two sides of the cut film-like structure 115 in the length direction may cover two sides of the object to be laminated 1141. In some embodiments, the two sides of the cut film-like structure 115 in the length direction may overlap with the two sides of the object to be laminated 1141. In some embodiments, the two sides of the cut film-like structure 115 in the length direction may be slightly longer than the two sides of the object to be laminated 1141. In some embodiments, one side of the cut film-like structure 115 in the length direction may overlap with one side of the object to be laminated 1141, and the other side of the cut film-like structure 115 in the length direction may be slightly longer than the other side of the object to be laminated 1141. In some embodiments, the first cutter assembly 11321 may be adapted to the fourth conveying device 1132. In some embodiments, the first cutter assembly 11321 may be located above the film-like structure 115 on the conveying surface of the fourth conveying device 1132, and the cutting direction of the first cutter assembly 11321 may be perpendicular to the conveying direction of the fourth conveying device 1132. The first cutter assembly 11321 may move up and down under the drive of the hydraulic device. When the first cutter assembly 11321 moves downward, the film-like structure 115 may be cut. In some embodiments, the first cutter assembly 11321 may also include a hob cutter device. For example, the hob cutter device may include a drum and a cutter extending along the length of the drum. The length of the drum may be consistent with the width direction of the film-like structure 115. In some embodiments, the length of the cutter may be greater than or equal to the width of the film-like structure 115, so as to divide the film-like structure 115 into a plurality of film-like structure units 1150. The position of the cutter may change with the circular movement of the drum, and the film-like structure 115 may be cut by the cutter by controlling the rotation speed of the drum. It should be noted that the first cutter assembly 11321 may not be limited to the content described above, and may also be other types of cutter assemblies that can realize the positioning and cutting of the film-like structure 115, which is not further limited here.

As shown in FIG. 5, the laminating device 110 may further include a glue application assembly 1142. The glue application assembly 1142 may be configured to apply glue to the surface of the object to be laminated 1141 on the conveying surface of the fifth conveying device 114. In some embodiments, the glue application assembly 1142 may be located above the object to be laminated 1141 so as to apply glue on the upper surface of the object to be laminated 1141 on the conveying surface of the fifth conveying device 114. In some embodiments, the glue application assembly 1142 may include a glue tank (not shown) and a glue roller. The glue tank may be configured to store glue, and the glue roller may be configured to apply the glue in the glue tank to the surface of the object to be laminated 1141 on the conveying surface of the fifth conveying device 114. In order to ensure that the object to be laminated 1141 and the film-like structure 115 are fully laminated, in some embodiments, a glue roller may apply glue to all areas on the surface of the object to be laminated. Too much glue applied to the object to be laminated 1141 may cause excessive consumption of glue. In order to ensure that the object to be laminated 1141 and the film-like structure 115 are fully laminated while reducing the consumption of glue, in some embodiments, a glue roller may apply glue on a partial area of the surface of the object to be laminated 1141. For example, when the conveying direction of the fifth conveying device 114 is perpendicular to that of the third conveying device 1131, the glue roller may be located above the fifth conveying device 114. When the glue roller is running, the glue may be applied to a partial area of the object to be laminated 1141, and at least one trace of the glue extending along the conveying direction of the fifth conveying device 114 may be left on the object to be laminated 1141 so that the object to be laminated 1141 on the fifth conveying device 114 may enter the laminating apparatus 113 and then be laminated with the film-like structure 115. In order to ensure that the object to be laminated 1141 and the film-like structure 115 are laminated closely, in some embodiments, the glue application assembly 1142 may include two glue rollers, both of which may be located along the conveying direction of the fifth conveying device 114. The two glue rollers may be arranged at intervals so that the surface of the object to be laminated 1141 on the fifth conveying device 114 may have two glue traces extending along the conveying direction of the fifth conveying device 114. After the object to be laminated 1141 on the fifth conveying device 114 enters the laminating apparatus 113, the two glue traces may bond the areas of the film-like structure 115 on both sides of the folded portion 1151. In some embodiments, the glue roller may be in contact with the glue in the glue tank and in contact with the surface of the object to be laminated 1141, and the glue roller may rotate relative to the surface of the object to be laminated 1141. In some embodiments, a vertical distance between the glue roller and the conveying surface of the fifth conveying device 114 may be equal to or less than the thickness of the object to be laminated 1141 so that the glue roller can apply glue to the surface of the object to be laminated 1141. It should be noted that a count of glue rollers in the glue application assembly 1142 may not be limited to the above-mentioned two, and may also be three, four, or more, that the glue can be applied to the surface of the object to be laminated 1141. Furthermore, the glue application assembly 1142 may not be limited to the above-mentioned structure of the glue roller in contact with the object to be laminated, and may also have other structures that the glue can be applied to the surface of the object to be laminated 1141. For example, the glue application assembly 1142 may include one or more spray heads, each of which may spray the glue in the glue tank onto the surface of the object to be laminated 1141.

Figure 6:
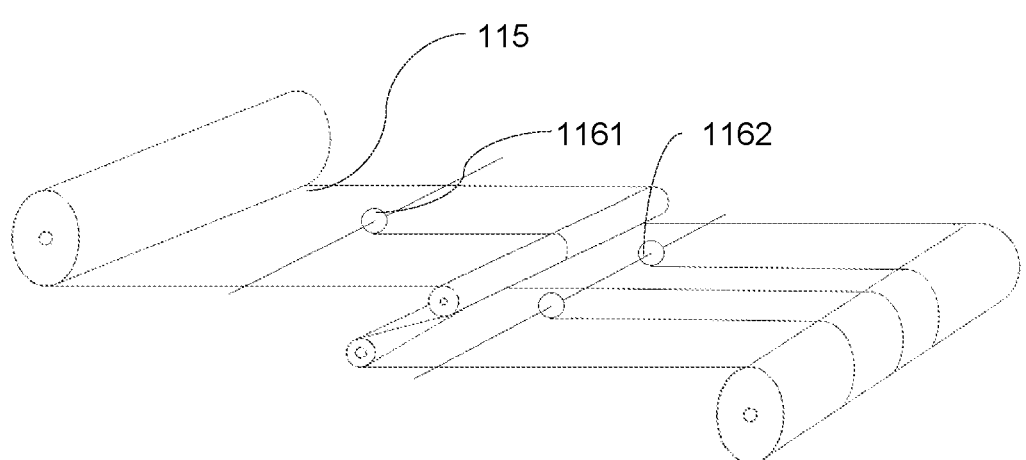
FIG. 6 is a schematic diagram illustrating an exemplary partial structure of a laminating device according to some embodiments of the present disclosure.

FIG. 6 is a schematic diagram illustrating an exemplary partial structure of a laminating device according to some embodiments of the present disclosure.

As shown in FIG. 6, in some embodiments, the laminating device 110 may further include a second cutter assembly. The second cutter assembly may be configured to divide the film-like structure 115 received or conveyed by the first conveying device 111. The specific width of the film-like structure 115 may be adapted to the width of the object to be laminated 1141. The width of the object to be laminated 1141 may be the dimension of the object to be laminated 1141 along the conveying direction of the fifth conveying device 114 in FIG. 5. In some embodiments, the cutting direction of the second cutter assembly may be arranged along the conveying direction of the first conveying device 111. In some embodiments, the second cutter assembly may be adapted to the first conveying device 111. In some embodiments, the second cutter assembly may include a plurality of sub-cutter assemblies. The plurality of sub-cutter assemblies may be distributed at intervals along the conveying direction of the first conveying device 111. The plurality of sub-cutter assemblies may alternately cut the film-like structure 115, and each sub-cutter assembly may be used as a spare for another sub-cutter assembly to extend the use time of each sub-cutter assembly. In some embodiments, the plurality of sub-cutter assemblies may include a first sub-cutter assembly 1161 and a second sub-cutter assembly 1162. The first sub-cutter assembly 1161 and the second sub-cutter assembly 1162 may be distributed at intervals along the conveying direction of the first conveying device 111. A cutter corresponding to the second sub-cutter assembly 1162 and a cutter corresponding to the first sub-cutter assembly 1161 may be distributed at intervals along a width direction of the first conveying device 111. The cutter corresponding to the first sub-cutter assembly 1161 may divide the film-like structure 115 with a large width into a film-like structure 115 with a small width. The cutter corresponding to the second sub-cutter assembly 1162 may cut the film-like structure 115 with the small width cut by the first sub-cutter assembly 1161, so as to obtain the film-like structure 115 with a smaller width. It should be noted that the count of sub-cutter assemblies may not be limited to one or two as described above, and may also be more than two, and the target width of the film-like structure 115 may be adjusted adaptively. In some embodiments, a film-like structure 115 with a specific width may be obtained by adjusting the count or the spacing of the cutters corresponding to the first sub-cutter assembly 1161 and the second sub-cutter assembly 1162.

FIG. 7 is a flowchart illustrating an exemplary laminating method 200 according to some embodiments of the present disclosure. In some embodiments, the process 200 may be executed by the processing device 120.

In 210, in response to a user's operation, the film-like structure 115 may be cut into a film-like structure 115 with a specific width by the second cutter assembly.

In some embodiments, the film-like structure 115 with a specific width may be obtained in operation 210. In some embodiments, the user's operation may be to input a specific width of the film-like structure 115 into the terminal 140. The processing device 120 may perform data processing based on the width data of the film-like structure 115 sent by the terminal 140. In some embodiments, the second cutter assembly may be configured to divide the film-like structure 115 received or conveyed by the first conveying device 111. The specific width of the film-like structure 115 may be adapted to the width of the object to be laminated 1141. In some embodiments, the cutting direction of the second cutter assembly may be arranged along the conveying direction of the first conveying device 111. More descriptions regarding operation 210 may be found elsewhere in the present disclosure, for example, FIG. 8 and the descriptions thereof.

In 220, the second conveying device 112 may be arranged along a conveying direction of the first conveying device 111, and the second conveying device 112 may receive the film-like structure 115 conveyed by the first conveying device 111.

In some embodiments, the first conveying device 111 may be configured to convey a film-like structure. In some embodiments, the material of the film-like structure may include, but is not limited to, one or more of polyvinyl chloride, polyethylene, polypropylene, polystyrene, or the like. In some embodiments, the film-like structure may include an optical film, a composite film, a superconducting film, or any other possible film structure. The first conveying device 111 may include a conveying surface. When the first conveying device 111 is running, the film-like structure may be placed on the conveying surface of the first conveying device 111 and conveyed from a starting point of the first conveying device 111 to an end point of the first conveying device 111. The second conveying device 112 may be configured to receive the film-like structure conveyed by the first conveying device 111. In some embodiments, the second conveying device 112 may be arranged along a conveying direction of the first conveying device 111. It can be understood that the conveying direction of the first conveying device 111 and the conveying direction of the second conveying device 112 may be the same. Specifically, a starting point of the second conveying device 112 may be close to the end point of the first conveying device 111 so that the film-like structure conveyed by the end point of the first conveying device 111 may enter the starting point of the second conveying device 112. In some embodiments, a height of the conveying surface of the second conveying device 112 may be the same as that of the conveying surface of the first conveying device 111. In some embodiments, the height of the conveying surface of the second conveying device 112 may also be different from that of the conveying surface of the first conveying device 111.

In 230, a conveying speed of the first conveying device 111 may be controlled to be greater than that of the second conveying device 112, so that the film-like structure 115 may form a folded portion 1151 on the second conveying device 112.

The conveying speed of the film-like structure on the first conveying device 111 may be greater than that of the film-like structure on the second conveying device 112. Since the film-like structure is a continuous flexible structure, the film-like structure with a faster speed on the first conveying device 111 may act on the film-like structure with a slower speed on the second conveying device 112, so that the film-like structure may form the folded portion on the second conveying device 112. In some embodiments, the conveying speed of the first conveying device 111 and the conveying speed of the second conveying device 112 may be a constant speed or a non-constant speed. In order to make the film-like structure on the second conveying device 112 form folded portions at specific intervals along a length direction of the film-like structure, in some embodiments, at least two suction assemblies may be distributed at intervals along the conveying direction of the second conveying device 112. Two adjacent suction assemblies may be controlled to respectively suction specific parts of the film-like structure so that the film-like structure may form the folded portion between the two adjacent suction assemblies. In some embodiments, the suction assembly 1121 may include at least two rows of openings (not shown in FIG. 4) distributed along the conveying direction of the second conveying device 112. The openings may pass through the conveying surface of the second conveying device 112. Each of the openings may be connected with an external power device (e.g., an air pump) to suction the film-like structure 115. In some embodiments, a plurality of openings may be evenly distributed on the entire conveying surface of the second conveying device 112. An opening/closing state of each of the plurality of openings may be controlled. For example, a valve may be provided inside each of the plurality of openings to control the opening/closing state of the corresponding opening. When the film-like structure is conveyed to the second conveying device 112, the corresponding opening(s) may be opened to make the film-like structure form folded portions at specific intervals along the length direction of the film-like structure.

When the first cutter assembly 11321 cuts the film-like structure 115, in order to prevent the first cutter assembly 11321 from cutting the folded portion 1151 lying on the film-like structure 115, which may cause damage to the laminated packaging material, in some embodiments, a distance between two adjacent rows of openings of the suction assembly 1121 may be controlled to be not less than twice the length of the folded portion 1151. More descriptions regarding the suction assembly may be found elsewhere in the present disclosure, for example, FIG. 4 and the descriptions thereof.

The length of the folded portion 1151 formed by the film-like structure 115 on the second conveying device 112 may be related to the conveying speed of the first conveying device 111 and the conveying speed of the second conveying device 112. The length $L_0$ of the folded portion 1151 may satisfy the following formula:

$$L_0 = L(V_1 - V_2)/MV_2 \tag{1}$$

where, $V_1$ denotes the conveying speed of the first conveying device 111, $V_2$ denotes the conveying speed of the second conveying device 112, L denotes a spread length of a film-like structure unit 1150, M denotes a count of layers of the folded portion 1151 of each film-like structural unit 1150. M may be an integer greater than or equal to 2.

When the length $L_0$ of the single-layer film-like structure 115 corresponding to the folded portion 1151 reaches a certain length, the film-like structure 115 corresponding to the folded portion 1151 may lie down on the plane part of the film-like structure 115. When the first cutter assembly 11321 cuts the film-like structure 115, in order to prevent the first cutter assembly 11321 from cutting the folded portion 1151 lying on the film-like structure 115, the length of the film-like structure unit 1150 in the folded state should be greater than or equal to $2ML_0$. For example, when the count of layers of the folded portion 1151 M is 2, the length $L_0$ of the single-layer film-like structure 115 corresponding to the folded portion 1151 should be less than or equal to one-fourth of L. Furthermore, it can be known from the above formula that when the conveying speed of the first conveying device 111 $V_1$ is equal to the conveying speed of the second conveying device 112 $V_2$, the film-like structure 115 does not have the folded portion 1151. When the conveying speed of the first conveying device 111 $V_1$ is 1.5 times the conveying speed of the second conveying device 112 $V_2$, $$L_0 = \frac{L}{4}.$$

Therefore, when the count of layers of the folded portion 1151 M is 2, a relationship between the conveying speed of the first conveying device 111 and the conveying speed of the second conveying device 112 may satisfy the following formula:

$$V_2 < V_1 < 1.5 V_2 \tag{2}$$

In some embodiments, the length of the folded portion 1151 may be controlled by adjusting the conveying speed of the first conveying device 111 or the conveying speed of the second conveying device 112. In some embodiments, the length of the folded portion 1151 may be increased by increasing the speed difference between the conveying speed of the first conveying device 111 and the conveying speed of the second conveying device 112. For example, when the conveying speed of the second conveying device 112 is unchanged, the conveying speed of the first conveying device 111 may be increased. As another example, when the conveying speed of the first conveying device 111 is unchanged, the conveying speed of the second conveying device 112 may be reduced. As another example, the conveying speed of the first conveying device 111 and the conveying speed of the second conveying device 112 may both change, where the speed difference between the conveying speed of the first conveying device 111 and the conveying speed of the second conveying device 112 increases. Conversely, the length of the folded portion 1151 may be reduced by reducing the speed difference between the conveying speed of the first conveying device 111 and the conveying speed of the second conveying device 112. In some embodiments, the position of the folded portion 1151 may also be controlled by adjusting the conveying speed of the first conveying device 111 or the conveying speed of the second conveying device 112. The position of the folded portion 1151 herein refers to the position of the folded portion 1151 relative to a film-like structure unit 1150. For example, by controlling the conveying speed of the first conveying device 111 or the conveying speed of the second conveying device 112, the position of the folded portion 1151 may be controlled to be located in a middle area of the film-like structure unit 1150. As another example, by controlling the conveying speed of the first conveying device 111 or the conveying speed of the second conveying device 112, the position of the folded portion 1151 may be controlled to be located at ⅓ of a total length of the film-like structure unit 1150. As another example, by controlling the conveying speed of the first conveying device 111 or the conveying speed of the second conveying device 112, the position of the folded portion 1151 may be controlled to be located at ¾ of the total length of the film-like structure unit 1150. The specific position and length of the folded portion 1151 in a film-like structure unit 1150 may be adjusted adaptively according to the application scenario of the packaging material and then realized by adjusting the conveying speed of the first conveying device 111 and the conveying speed of the second conveying device 112.

In 240, the film-like structure 115 with the folded portion 1151 may be laminated with the object to be laminated 1141.

In some embodiments, the film-like structure with the folded portion may be laminated with the object to be laminated on the laminating apparatus 113. The laminating apparatus 113 may be configured to transfer the object to be laminated and receive the film-like structure 115 conveyed by the second conveying device 112. More descriptions regarding operation 240 may be found elsewhere in the present disclosure, for example, FIG. 9 and the descriptions thereof.

In 250, the laminated film-like structure 115 may be cut by the first cutter assembly 11321 so that two sides of the film-like structure 115 in a length direction may cover two sides of the object to be laminated 1141.

The first cutter assembly 11321 may be configured to cut the film-like structure 115 on the conveying surface of the fourth conveying device 1132. The film-like structure 115 may be cut into at least one film-like structure unit 1150. Two sides of the film-like structure unit 1150 in the length direction may cover two sides of the object to be laminated 1141. In some embodiments, the two sides of the film-like structure unit 1150 in the length direction may overlap with the two sides of the object to be laminated 1141. In some embodiments, the two sides of the film-like structure unit 1150 in the length direction may be slightly longer than the two sides of the object to be laminated 1141. In some embodiments, the first cutter assembly 11321 may be adapted to the fourth conveying device 1132. In some embodiments, the first cutter assembly 11321 may be located above the film-like structure 115 on the conveying surface of the fourth conveying device 1132, and the cutting direction of the first cutter assembly 11321 may be perpendicular to the conveying direction of the fourth conveying device 1132. The first cutter assembly 11321 may move up and down under the drive of the hydraulic device. When the first cutter assembly 11321 moves downward, the film-like structure 115 may be cut.

It should be noted that the above descriptions about the laminating method 200 are merely provided for the purposes of illustration, and not intended to limit the scope of the present disclosure. Apparently, for persons having ordinary skills in the art, multiple variations and modifications to the laminating method 200 may be conducted under the teachings of the present disclosure. However, those variations and modifications do not depart from the scope of the present disclosure. For example, when the width of the film-like structure 115 is fixed, operation 210 may be omitted. As another example, other processes may be used to cut the laminated film-like structure 115, and operation 250 may be omitted.

Operation 210 of the laminating method 200 will be further described below in conjunction with FIG. 8. FIG. 8 is a flowchart illustrating an exemplary process for cutting a film-like structure into a film-like structure with a specific width by a second cutter assembly according to some embodiments of the present disclosure. As shown in FIG. 8, operation 210 may include the following operations.

In 211, at least one sub-cutter assembly of the second cutter assembly may be distributed at intervals along the conveying direction of the first conveying device 111.

In some embodiments, the second cutter assembly may include a plurality of sub-cutter assemblies, and the plurality of sub-cutter assemblies may be distributed at intervals along the conveying direction of the first conveying device 111.

In 212, the at least one sub-cutter assembly may be controlled to cut the film-like structure 115.

In some embodiments, the plurality of sub-cutter assemblies may be controlled to alternately cut the film-like structure 115, and each sub-cutter assembly may be used as a spare for another sub-cutter assembly to extend the use time of each sub-cutter assembly.

In 213, whether the width of the cut film-like structure 115 is equal to a specific width may be determined.

In some embodiments, operation 213 may be implemented by any possible means such as the processing device 120 or a distance sensor.

In 214, in response to determining that the width of the cut film-like structure 115 is not equal to the specific width, another sub-cutter assembly of the second cutter assembly may be controlled to cut the cut film structure 115, till the width of the cut film-like structure 115 is equal to the specific width.

In some embodiments, the plurality of sub-cutter assemblies may include a first sub-cutter assembly 1161 and a second sub-cutter assembly 1162. The first sub-cutter assembly 1161 and the second sub-cutter assembly 1162 may be distributed at intervals along the conveying direction of the first conveying device 111. A cutter corresponding to the second sub-cutter assembly 1162 and a cutter corresponding to the first sub-cutter assembly 1161 may be distributed at intervals along a width direction of the first conveying device 111. In some embodiments, the cutter corresponding to the first sub-cutter assembly 1161 may be controlled to cut the film-like structure 115 with a large width to a film-like structure 115 with a small width. The cutter corresponding to the second sub-cutter assembly 1162 may be controlled to cut the film-like structure 115 with the small width cut by the first sub-cutter assembly 1161, so as to obtain the film-like structure 115 with a smaller width. In some embodiments, a film-like structure 115 with a specific width may be obtained by adjusting the count or the spacing of the cutters corresponding to the first sub-cutter assembly 1161 and the second sub-cutter assembly 1162. In some embodiments, three or more sub-cutter assemblies may be controlled to cut the film-like structure 115.

In 215, in response to determining that the width of the cut film-like structure 115 is equal to the specific width, the cut film-like structure 115 may be conveyed to the second conveying device 112.

It should be noted that the above descriptions about operation 210 are merely provided for the purposes of illustration, and not intended to limit the scope of the present disclosure. Apparently, for persons having ordinary skills in the art, multiple variations and modifications to operation 210 may be conducted under the teachings of the present disclosure. However, those variations and modifications do not depart from the scope of the present disclosure.

Operation 240 of the laminating method 200 will be further described below in conjunction with FIG. 9. FIG. 9 is a flowchart illustrating an exemplary process for laminating the folded portion 1151 of the film-like structure 115 with the object to be laminated 1141 according to some embodiments of the present disclosure. As shown in FIG. 9, operation 240 may include the following operations.

In 241, the laminating apparatus 113 may include a third conveying device 1131 and a fourth conveying device 1132. The third conveying device 1131 may be configured to receive and convey the object to be laminated 1141. The fourth conveying device 1132 may be configured to receive the film-like structure 115 conveyed by the second conveying device 112 and the object to be laminated 1141 conveyed by the third conveying device 1131. The fourth conveying device 1132 may be arranged along a conveying direction of the third conveying device 1131.

In some embodiments, the third conveying device 1131 may be arranged along the conveying direction of the second conveying device 112. The object to be laminated received by the third conveying device 1131 may be conveyed to other sub-devices of the laminating apparatus 113 to complete the laminating with the film-like structure with the folded portion. In some embodiments, the fourth conveying device 1132 may be configured to receive the film-like structure conveyed by the second conveying device 112 and the object to be laminated conveyed by the third conveying device 1131 and laminate the film-like structure with the folded portion with the object to be laminated. In order to prevent the entering of the object to be laminated to the third conveying device 1131 from affecting the normal convey-ance of the film-like structure between the second conveying device 112 and the fourth conveying device, in some embodiments, the conveying surface of the third conveying device 1131 may be lower than that of the second conveying device 112. A height difference between the conveying surface of the second conveying device 112 and the con-veying surface of the third conveying device 1131 may be greater than a thickness of the object to be laminated.

In 242, glue may be applied to the surface of the object to be laminated 1141.

In some embodiments, a glue application assembly 1142 may be used to apply the glue to the surface of the object to be laminated 1141. In some embodiments, the glue appli-cation assembly 1142 may include a glue tank and a glue roller. The glue tank may be configured to store glue, and the glue roller may be configured to apply the glue in the glue tank to the surface of the object to be laminated 1141. In some embodiments, the glue application assembly 1142 may include two glue rollers, both of which may be located along the conveying direction of the fifth conveying device 114. The two glue rollers may be arranged at intervals so that the surface of the object to be laminated 1141 on the fifth conveying device 114 may have two glue traces extending along the conveying direction of the fifth conveying device 114. After the object to be laminated 1141 on the fifth conveying device 114 enters the laminating apparatus 113, the two glue traces may bond the areas of the film-like structure 115 on both sides of the folded portion 1151. In some embodiments, the glue roller may be in contact with the glue in the glue tank and in contact with the surface of the object to be laminated 1141, and the glue roller may rotate relative to the surface of the object to be laminated 1141. In some embodiments, the object to be laminated 1141 applied with the glue may be conveyed to the third convey-ing device 1131 by the fifth conveying device 114. In some embodiments, the conveying direction of the fifth conveying device 114 may be perpendicular to that of the third con-veying device 1131. In some embodiments, the conveying surface of the fifth conveying device 114 may be lower than, higher than, or equal to the conveying surface of the third conveying device 1131. When the object to be laminated on the conveying surface of the fifth conveying device 114 is separated from the conveying surface of the fifth conveying device 114 at an end point, the object to be laminated will continue to move along the conveying direction of the fifth conveying device 114 due to the inertia of the object to be laminated, thereby being conveyed to the conveying surface of the third conveying device 1131. In some embodiments, the conveying direction of the fifth conveying device 114 may also be the same as that of the third conveying device 1131, where the fifth conveying device 114 may be located on a side of the third conveying device 1131 away from the starting point of the fourth conveying device 1132. The object to be laminated on the fifth conveying device 114 may be conveyed to the starting point of the third conveying device 1131 from the end point of the fifth conveying device 114. In some embodiments, the glue application assembly 1142 may be configured to apply glue to the surface of the object to be laminated 1141 on the conveying surface of the fifth conveying device 114. In some embodiments, the glue application component 1142 may be adapted to the fifth conveying device 114. In some embodiments, the glue application assembly 1142 may be located above the object to be laminated 1141. In some embodiments, a vertical distance between the glue roller and the conveying surface of the fifth conveying device 114 may be equal to or less than the thickness of the object to be laminated 1141.

In 243, during the process of being conveyed from the conveying surface of the third conveying device 1131 to the conveying surface of the fourth conveying device 1132, the glue-applied surface of the object to be laminated 1141 may be laminated with the film-like structure 115.

In order to realize the lamination between the film-like structure and the object to be laminated, in some embodi-ments, the conveying surface of the fourth conveying device 1132 may be higher than that of the conveying surface of the third conveying device 1131. A height difference between the conveying surface of the third conveying device 1131 and the conveying surface of the fourth conveying device 1132 may not be greater than the thickness of the object to be laminated. When the object to be laminated on the conveying surface of the third conveying device 1131 is conveyed to the conveying surface of the fourth conveying device 1132, since the height difference between the con-veying surface of the third conveying device 1131 and the conveying surface of the fourth conveying device 1132 is not greater than the thickness of the object to be laminated, the object to be laminated may be pressed by the conveying surface of the fourth conveying device 1131 and the film-like structure to realize the lamination between a side of the film-like structure facing the fourth conveying device 1132 and a side of the object to be laminated away from the fourth conveying device 1132.

It should be noted that the above descriptions about operation 240 are merely provided for the purposes of illustration, and not intended to limit the scope of the present disclosure. Apparently, for persons having ordinary skills in the art, multiple variations and modifications to operation 240 may be conducted under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exem-plary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appre-ciated that two or more references to "an embodiment" or "one embodiment" or "an alternative embodiment" in vari-ous portions of this specification are not necessarily all referring to the same embodiment. Furthermore, the particu-lar features, structures, or characteristics may be combined as suitable in one or more embodiments of the present disclosure.

Furthermore, the recited order of processing elements or sequences, or the use of numbers, letters, or other designa-tions, therefore, is not intended to limit the claimed pro-cesses and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A laminating device, comprising:
a first conveying device configured to convey a film-like structure;
a second conveying device arranged along a conveying direction of the first conveying device, a conveying speed of the first conveying device being greater than that of the second conveying device, the second conveying device receiving the film-like structure conveyed by the first conveying device, the film-like structure forming a folded portion on the second conveying device;
a laminating apparatus configured to convey an object to be laminated and receive the film-like structure conveyed by the second conveying device, wherein the film-like structure with the folded portion is laminated with the object to be laminated on the laminating apparatus; and
a plurality of suction assemblies, wherein the plurality of suction assemblies are distributed at intervals on a conveying surface of the second conveying device, and two adjacent suction assemblies respectively suction the film-like structure so that the film-like structure forms the folded portion between the two adjacent suction assemblies.

2. The laminating device of claim 1, wherein the laminating apparatus comprises a third conveying device arranged along a conveying direction of the second conveying device,
the third conveying device is configured to receive and convey the object to be laminated;
a conveying surface of the third conveying device is lower than that of the second conveying device, and
a height difference between the conveying surface of the second conveying device and the conveying surface of the third conveying device is greater than a thickness of the object to be laminated.

3. The laminating device of claim 2, wherein the laminating apparatus further comprises a fourth conveying device arranged along a conveying direction of the third conveying device,
the fourth conveying device is configured to receive the film-like structure conveyed by the second conveying device and the object to be laminated conveyed by the third conveying device, and laminate the folded portion of the film-like structure and the object to be laminated;
a conveying surface of the fourth conveying device is higher than that of the third conveying device, and
a height difference between the conveying surface of the third conveying device and the conveying surface of the fourth conveying device is not greater than the thickness of the object to be laminated.

4. The laminating device of claim 1, wherein
the plurality of suction assemblies include at least two rows of openings distributed at intervals along the conveying direction of the second conveying device, and
a distance between two adjacent rows of openings is not less than 2 times a length of the folded portion.

5. The laminating device of claim 3, further comprising a first cutter assembly, wherein
a cutting direction of the first cutter assembly is perpendicular to a conveying direction of the fourth conveying device;
the first cutter assembly is configured to cut the film-like structure on a conveying surface of fourth conveying device, and
two sides of the cut film-like structure in a length direction cover two sides of the object to be laminated.

6. The laminating device of claim 1, further comprising a fifth conveying device configured to convey the object to be laminated to the laminating apparatus, wherein a conveying direction of the fifth conveying device is perpendicular or parallel to that of the laminating apparatus.

7. The laminating device of claim 6, further comprising a glue application assembly configured to apply glue to a surface of the object to be laminated on a conveying surface of the fifth conveying device.

8. The laminating device of claim 7, wherein the glue application assembly comprises:

a glue tank configured to store the glue; and a glue roller configured to apply the glue in the glue tank to the surface of the object to be laminated on the conveying surface of the fifth conveying device.

9. The laminating device of claim 1, further comprising a second cutter assembly configured to cut the film-like structure received or conveyed by the first conveying device into a film-like structure with a specific width; wherein the second cutter assembly includes at least one sub-cutter assembly, and the at least one sub-cutter assembly is distributed at intervals along the conveying direction of the first conveying device.

10. The laminating device of claim 9, wherein the at least one sub-cutter assembly includes a first sub-cutter assembly and a second sub-cutter assembly, the first sub-cutter assembly and the second sub-cutter assembly are distributed at intervals along the conveying direction of the first conveying device, and a cutter corresponding to the second sub-cutter assembly and a cutter corresponding to the first sub-cutter assembly are distributed at intervals along a width direction of the first conveying device.

11. A laminating method using the laminating device of claim 1, comprising:

arranging the second conveying device along the conveying direction of the first conveying device;

controlling the conveying speed of the first conveying device to be greater than that of the second conveying device so that the film-like structure forms the folded portion on the second conveying device; and laminating the film-like structure with the folded portion with the object to be laminated.

12. The laminating method of claim 11, wherein a length of the folded portion of the film-like structure formed on the second conveying device is related to the conveying speed of the first conveying device and the conveying speed of the second conveying device.

13. The laminating method of claim 11, wherein the controlling the conveying speed of the first conveying device to be greater than that of the second conveying device so that the film-like structure forms the folded portion on the second conveying device comprises:

controlling at least one of the length and a position of the folded portion by adjusting at least one of the conveying speed of the first conveying device and the conveying speed of the second conveying device.

14. The laminating method of claim 11, wherein the laminating device further comprises a second cutter assembly, the second cutter assembly includes at least one sub-cutter assembly, and the at least one sub-cutter assembly is distributed at intervals along the conveying direction of the first conveying device, the laminating method comprises:

controlling the at least one sub-cutter assembly of the second cutter assembly to cut the film-like structure;

determining whether a width of the cut film-like structure is equal to a specific width; and in response to determining that the width of the cut film-like structure is not equal to the specific width, controlling another sub-cutter assembly of the second cutter assembly to cut the cut film-like structure, till the width of the cut film-like structure is equal to the specific width.

15. The laminating device of claim 1, wherein the plurality of suction assemblies include at least two rows of openings distributed along the conveying direction of the second conveying device, the openings pass through the conveying surface of the second conveying device, and each of the openings is connected with an external power device to suction the film-like structure.

16. The laminating device of claim 15, wherein a distance between two adjacent rows of openings at least two rows of openings is not less than twice a length of the folded portion.

17. The laminating device of claim 3, wherein the fourth conveying device includes a pressurizing component, the pressurizing component is located above the conveying surface of the fourth conveying device, and the pressurizing component applies pressure to the film-like structure and the object to be laminated on the conveying surface of the fourth conveying device.

18. The laminating device of claim 5, wherein the first cutter assembly includes a hob cutter device, the hob cutter device includes a drum and a cutter extending along a length of the drum, a length of the cutter is greater than or equal to a width of the film-like structure, and the position of the cutter changes with a circular movement of the drum.

19. The laminating device of claim 8, wherein a vertical distance between the glue roller and the conveying surface of the fifth conveying device is equal to or less than a thickness of the object to be laminated.

* * * * *